United States Patent
Cho et al.

(10) Patent No.: US 11,352,018 B2
(45) Date of Patent: Jun. 7, 2022

(54) SYSTEM FOR DIAGNOSING SOFTWARE FOR VEHICLE AND OPERATING METHOD THEREOF

(71) Applicant: HYUNDAI AUTOEVER CORP., Seoul (KR)

(72) Inventors: Jun-Ho Cho, Seoul (KR); Jin-Su Jang, Anyang-si (KR)

(73) Assignee: Hyundai Autron Co., Ltd., Seoul (KR)

( * ) Notice: Subject to any disclaimer, the term of this patent is extended or adjusted under 35 U.S.C. 154(b) by 424 days.

(21) Appl. No.: 16/393,505

(22) Filed: Apr. 24, 2019

(65) Prior Publication Data
US 2019/0367042 A1 Dec. 5, 2019

(30) Foreign Application Priority Data
May 31, 2018 (KR) .......................... 10-2018-0062673

(51) Int. Cl.
*B60W 50/02* (2012.01)
*G06F 11/36* (2006.01)

(52) U.S. Cl.
CPC ..... *B60W 50/0205* (2013.01); *G06F 11/3668* (2013.01)

(58) Field of Classification Search
CPC .... G06F 8/30; G06F 8/447; G06F 11/36–362; G06F 11/3636; G06F 11/366; G06F 11/3668–3696; B60W 50/0205
See application file for complete search history.

(56) References Cited

U.S. PATENT DOCUMENTS

| 8,402,438 | B1* | 3/2013 | Andrews | G06F 11/3676 717/126 |
| 8,732,670 | B1* | 5/2014 | Daudel | G06F 12/0253 717/127 |
| 2006/0212540 | A1* | 9/2006 | Chon | G06F 11/3688 709/218 |

(Continued)

FOREIGN PATENT DOCUMENTS

| KR | 10-2011-0023124 A | 3/2011 |
| KR | 10-2011-0059420 A | 6/2011 |

(Continued)

OTHER PUBLICATIONS

Fang et al., "Formal Model-Based Test for AUTOSAR multicore RTOS", published by IEEE, 2012 IEEE Fifth International Conference on Software Testing, Verification and Validation, pp. 251-259 (Year: 2012).*

(Continued)

*Primary Examiner* — S. Sough
*Assistant Examiner* — Zheng Wei
(74) *Attorney, Agent, or Firm* — Morgan, Lewis & Bockius LLP (57) ABSTRACT

A method of operating a system for diagnosing software for a vehicle according to the present invention includes: generating a plurality of data sets including a function and an argument related to a diagnosis of target software executed in each of the plurality of cores; sequentially outputting the plurality of data sets to a shared memory; operating the target software according to the data set of the shared memory; and verifying the operation result in a verifying core.

10 Claims, 8 Drawing Sheets

(56) References Cited

U.S. PATENT DOCUMENTS

| | | | |
|---|---|---|---|
| 2012/0239222 A1* | 9/2012 | Keckeisen | B60W 50/0205 |
| | | | 701/1 |
| 2013/0061098 A1 | 3/2013 | Shigehara | |
| 2015/0378870 A1* | 12/2015 | Marron | G06F 11/362 |
| | | | 717/128 |
| 2017/0010958 A1 | 1/2017 | Ellis et al. | |
| 2017/0276725 A1* | 9/2017 | Birurakis | G01R 31/31724 |
| 2019/0171551 A1* | 6/2019 | Laredo | G06F 11/3684 |
| 2019/0278677 A1* | 9/2019 | Terechko | G06F 11/2242 |

FOREIGN PATENT DOCUMENTS

| | | |
|---|---|---|
| KR | 10-2014-0078344 A | 6/2014 |
| KR | 10-2016-0047147 A | 5/2016 |
| KR | 10-1804603 B1 | 12/2017 |

OTHER PUBLICATIONS

Adir et al., "Using a High-Level Test Generation Expert System for Testing In-Car Networks", published by ACM, DAC '14, Jun. 1-5, 2014, San Francisco, CA, USA, pp. 1-6 (Year: 2014).*

Park et al., "Test methods of the AUTOSAR application software components", published by ICROS-SICE International Joint Conference 2009, Aug. 18-21, 2009, Fukuoka International Congress Center, Japan, pp. 2601-2606 (Year: 2009).*

Macher et al., ("Automotive Embedded Software: Migration Challenges to Multi-Core Computing Platforms", published by IEEE, pp. 1386-1393 (Year: 2015).*

Kim, Minsook, "*Testing method for a software unit in real target environment*", May 12, 2015, Newsletter of Hancom MDS Inc.

* cited by examiner

SYSTEM FOR DIAGNOSING SOFTWARE FOR VEHICLE AND OPERATING METHOD THEREOF

CROSS-REFERENCE TO RELATED APPLICATIONS

This application claims priority to and the benefit of Korean Patent Application No. 10-2018-0062673 filed in the Korean Intellectual Property Office on May 31, 2018, the entire contents of which are incorporated herein by reference.

TECHNICAL FIELD

The present invention relates to a system for diagnosing software for a vehicle, and an operating method thereof.

BACKGROUND ART

As an electric and electronic structure of a vehicle becomes complicated, the amount and complexity of software for controlling the structure also increase. Accordingly, the time required to develop software is also increased, and a probability of software defects is also increased.

In order to solve complexity of software and decrease defects of software, there is a need for a standardized software platform that ensures reliability and reusability in an embedded software technology field for a vehicle.

To this end, the European automotive advanced industry and component suppliers collaborated to form a standard for an automotive embedded software platform called AUTomotive Open System Architecture (AUTOSAR).

AUTOSAR is a software standard platform for a vehicle electronic component developed for the purpose of ensuring reliability and reusability, and many automotive companies are focusing on the development of commercial vehicles equipped with platforms developed based on AUTOSAR.

The AUTOSAR software platform contains an integrated specification to be applied to various controllers, such as communication, diagnosis, and a memory, and in order to be actually applied to the controller, the AUTOSAR software platform goes through a process of extracting only a required software part and reconfiguring a system. The reconfiguration process is one of the core technologies for using the AUTOSAR software platform.

RELATED ART LITERATURE

Patent Document (Patent Document 1) Korean Patent Application Laid-Open No. 10-2011-0059420 (published on Jun. 2, 2011, entitled "Apparatus and Method of Diagnosing Electronic Control Unit for Vehicle")

(Patent Document 2) Korean Patent Application Laid-Open No. 10-2014-0078344 (published on Jun. 25, 2014, entitled "Method of Determining Performance of Software for Vehicle")

(Patent Document 3) Korean Patent No. 10-1804603 (registered on Nov. 28, 2017, entitled "Method for Reconfiguring Software Parameter in Microcontroller, Microcontroller, and Control Device")

(Patent Document 4) Korean Patent Application Laid-Open No. 10-2016-0047147 (published on May 2, 2016, entitled "Apparatus and Method of Verifying Software Platform based on AUTOSAR")

(Patent Document 5) US Patent Application Publication No. US 2017/0010958 (published on Jan. 12, 2017, entitled "REAL TIME ANALYSIS AND CONTROL FOR A MULTIPROCESSOR SYSTEM")

SUMMARY OF THE INVENTION

The present invention has been made in an effort to provide a system for diagnosing software for a vehicle, which is capable of decreasing costs and verification time, and an operating method thereof.

The present invention has also been made in an effort to provide a system for diagnosing software for a vehicle, which is capable of decreasing a use of a memory, and an operating method thereof.

An exemplary embodiment of the present invention provides a method of operating a system for diagnosing software for a vehicle, the method including: generating a plurality of data sets including a function and an argument related to a diagnosis of target software executed in each of the plurality of cores; sequentially outputting the plurality of data sets to a shared memory; operating the target software according to the data set of the shared memory; and verifying the operation result in a verifying core.

The generating of the plurality of data sets may include: extracting memory map information and function and argument information from the target software; and combining the extracted memory map information and function and argument information and converting the combined memory map information and function and argument information to a database.

The operating of the target software may include checking, by the target software, the data set of the shared memory and reading the data set from the shared memory and operating the target software when the data set exists in the shared memory.

The operating of the target software may include operating the target software according to the function and argument information included in the data set in such a manner that the function is executed while changing the argument.

The method may further include determining whether a verification of the target software based on the plurality of data sets is completed, and when the verification of the target software is not completed, outputting a next data set to the shared memory.

The method may further include when the verification of the target software is completed, converting the verification result for the target software into a database.

The plurality of cores and the verifying core may configure one multicore system for a vehicle.

Another exemplary embodiment of the present invention provides a system for diagnosing software for a vehicle, the system including: a target unit configured to extract memory map information and function and argument information from each of target software corresponding to a plurality of cores; a data unit configured to combine the extracted memory map information and function and argument information; a verifying unit configured to generate a plurality of data sets by converting the combined information into a database according to a specification of each of the target software; a shared memory configured to store at least one of the plurality of data sets; and a test manager configured to operate the target unit according to the data set stored in the shared memory and let the target unit operate the target software according to the data set.

The target unit may operate the target software under a control of the target manager, and transmit the operation result to the shared memory.

The verifying unit may read an operation result stored in the shared memory, compare the read operation result and an expected operation result, and verify the target software.

The verifying unit may include a verifying core including a verifying platform for verifying the plurality of cores.

The verifying unit may determine whether there exists a data set which is not output to the shared memory, and when there exists the data set, the verifying unit may output a next data set to the shared memory, and when there does not exist the data set, the verifying unit may convert the verification result into a database.

The target unit may operate the target software according to the function and argument information included in the data set in such a manner that the function is executed while changing the argument.

The system for diagnosing software for a vehicle, and the operating method thereof according to the exemplary embodiment of the present invention may verify target software operated in a plurality of cores according to autonomous verifying software without a separate test bench or test code. Accordingly, the system for diagnosing software for a vehicle, and the operating method thereof of the present invention may verify software in real time without using a high-cost test bench.

The system for diagnosing software for a vehicle, and the operating method thereof according to the exemplary embodiment of the present invention use a shared memory by the portion corresponding to the required data sets related to a test, thereby solving shortage of the shared memory compared to the related art.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings below are for helping to understand the present exemplary embodiment, and exemplary embodiments are provided together with the detailed description. However, a technical characteristic of the present exemplary embodiment is not limited to a specific drawing, and the characteristics disclosed in the drawings may be combined with each other to be configured as a new embodiment.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

In the following, the contents of the present invention will be described clearly and in detail by using the drawings so that those skilled in the art can easily carry out the present invention.

The present invention may be variously changed and have various forms, so that specific exemplary embodiments will be exemplified in the drawings and described in detail in the description below. However, this does not intend to limit the present invention to a specific disclosure form, and it will be appreciated that the present invention includes all of the modifications, equivalent matters, and substitutes included in the spirit and the technical scope of the present invention. Terms "first", "second" and the like may be used for describing various constituent elements, but the constituent elements should not be limited to the terms.

The terms are used only to discriminate one constituent element from another constituent element. For example, without departing from the scope of the invention, a first constituent element may be named as a second constituent element, and similarly a second constituent element may also be named as a first constituent element. It should be understood that when one constituent element is referred to as being "coupled to" or "connected to" another constituent element, one constituent element can be directly coupled to or connected to the other constituent element, but intervening elements may also be present. By contrast, when one constituent element is referred to as being "directly coupled to" or "directly connected to" another constituent element, it should be understood that there are no intervening elements.

Other expressions, that is, "between ~" and "just between ~" or "adjacent to ~" and "directly adjacent to ~" explaining a relationship between the constituent elements should be interpreted in the same way. Terms used in the present application are used only to describe specific exemplary embodiments, and are not intended to limit the present invention. Singular expressions used herein include plural expressions unless they have definitely opposite meanings in the context.

In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance. All terms used herein including technical or scientific terms have the same meanings as meanings which are generally understood by those skilled in the art unless they are differently defined. Terms defined in a generally used dictionary shall be construed that they have meanings matching those in the context of a related art, and shall not be construed in ideal or excessively formal meanings unless they are clearly defined in the present application.

Figure 1:
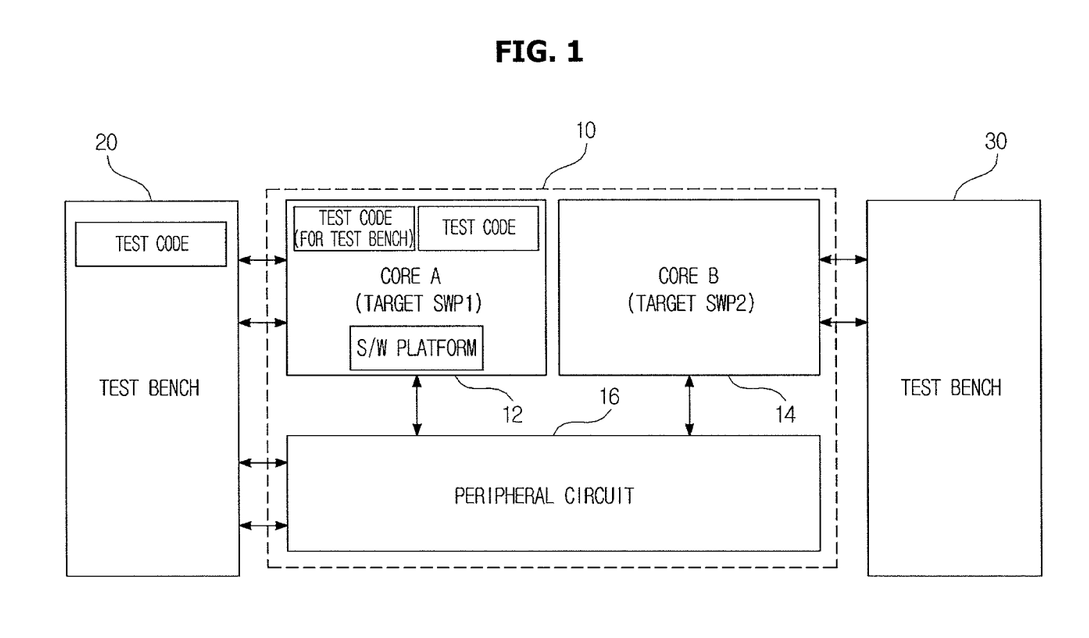
FIG. 1 is a diagram illustrating an example of a general system 1 for diagnosing software for a vehicle.

FIG. 1 is a diagram illustrating an example of a general system 1 for diagnosing software for a vehicle. Referring to FIG. 1, a system 1 for diagnosing software for a vehicle includes a multicore system 10 and a plurality of test benches 20 and 30.

The multicore system 10 includes a first core (A) 12, a second core (B) 14, and a peripheral circuit 16. The first core 12 is driven by first target software SWP1, and the second core 14 is driven by second target software SWP2. The peripheral circuit 16 includes an input/output device, a timer, a memory, and the like.

In the case of the general system 1 for diagnosing software for a vehicle, at least one of the test benches 20 and 30 transmits a test code to the multicore system 10, and verifies an operation of the target software SWP1 and SWP2 executed in the cores 12 and 14, respectively, according to the test code.

The test benches 20 and 30 transmit commands to the target software and operate the target software, and verify the target software based on the operation result through various communication schemes, such as a Control Area Network (CAN), a Universal Asynchronous Receiver/Transmitter (UART), an Inter Integrated Circuit (I2C), a Serial Peripheral interface (SPI), and Ethernet.

The general system 1 for diagnosing software for a vehicle requires a target vehicle controller, that is, the test benches 20 and 30 completely separated from the multicore system 10, so that there are various problems, such as installation cost required for the test benches 20 and 30 and an increase in diagnosis time for the multicore system 10, that are burdensome to the diagnosis of software for a vehicle.

Communication lines for connecting the test benches 20 and 30 and the multicore system 10 and a test code of each core are required, and there is a demand for development of a new environment for reading an operation result of software by the test benches 20 and 30. Accordingly, the test of the software for a vehicle is inevitably performed in a load increased situation.

The general system 1 for diagnosing software for a vehicle requires a considerable amount of test cases for performing the verification of the target software, so that a memory of a core, to which the target software is loaded, may be lacking.

Accordingly, the general system 1 for diagnosing software for a vehicle needs to periodically correct or build a test code in order to verify the entire target software SWP1 and SWP2.

A system for diagnosing software for a vehicle according to an exemplary embodiment of the present invention configures a platform for verifying one core in a multicore environment to be implemented so as to verify other cores.

Figure 2:
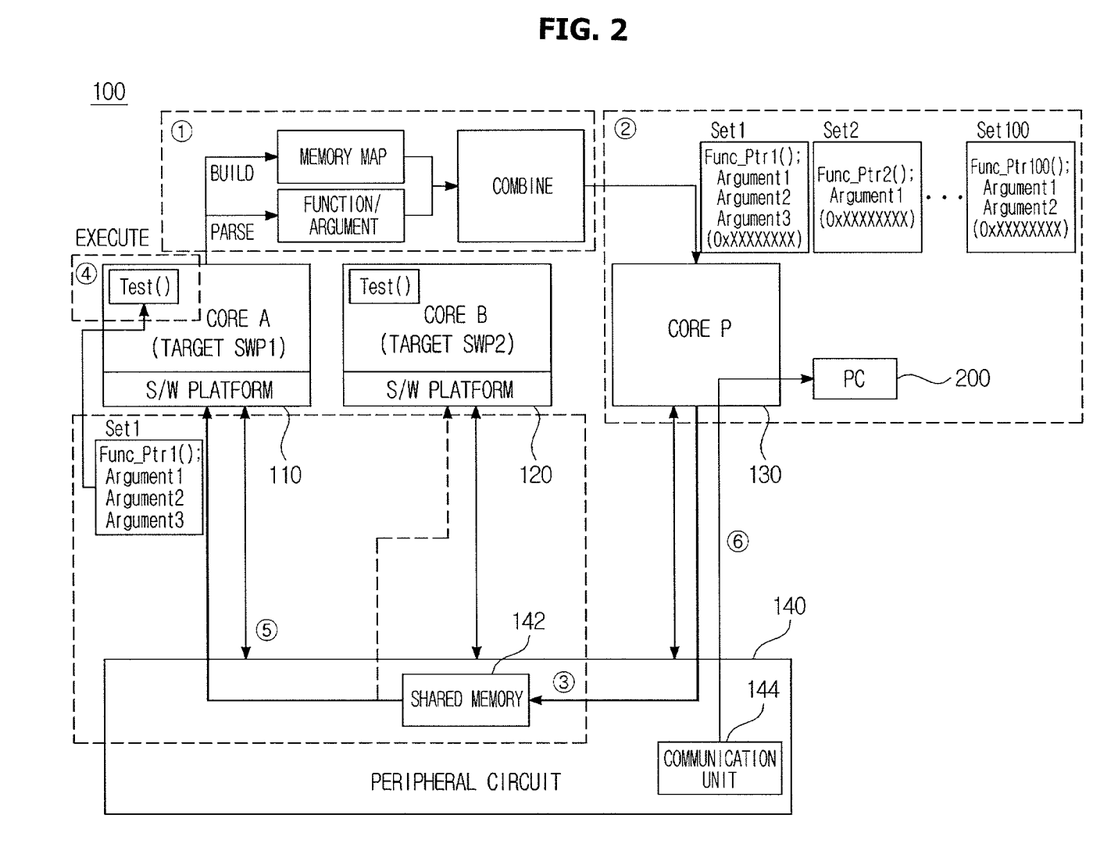
FIG. 2 is a block diagram illustrating an example of a vehicle multicore system 100 according to an exemplary embodiment of the present invention.

FIG. 2 is a block diagram illustrating an example of a vehicle multicore system 100 according to an exemplary embodiment of the present invention.

Referring to FIG. 2, the vehicle multicore system 100 may include a first core (A) 110, a second core (B) 120, a third core (P) 130, and a peripheral circuit 140.

The first core 110 may be implemented to be driven by first target software SWP1. Although not illustrated, the first target software SWP1 may be stored in a non-volatile memory (for example, a Read Only Memory (ROM), a flash memory, a resistive memory) inside a multicore system 100.

The second core 120 may be implemented to be driven by second target software SWP2. The second target software SWP2 may be stored in a non-volatile memory.

The third core 130 may be implemented to be driven by verification software. The verification software may verify operations of the first target software SWP1 and the second target software SWP2 based on various data sets.

Each data set may be formed of a combination of a function and an argument. The verification software may be stored in a non-volatile memory.

In the exemplary embodiment, each of the first target software SWP1 and the second target software SWP2 may be implemented so as to receive the data set transmitted from the verification software and perform a test operation according to the received data set.

In the exemplary embodiment, the verification software may sequentially transmit the data set to the target software SWP1 and SWP2. In the meantime, FIG. 2 illustrates the three cores 110, 120, and 130, but it will be appreciated that the number of cores of the multicore system 100 is not limited thereto.

In the meantime, FIG. 2 illustrates the separate core 130 driving the verification software, but it will be appreciated that there may not exist a separate core for driving only the verification software.

The peripheral circuit 140 may include various devices (an input/output device, a timer, and a memory) required for driving the multicore system 100. Particularly, the peripheral circuit 140 may include a shared memory 142 shared by the cores 110, 120, and 130, and a communication unit 144 for performing communication with an external device.

In the exemplary embodiment, the shared memory 142 may be a volatile memory (for example, a Random Access Memory (RAM) and a Synchronous Random Access Memory (SRAM)).

In the meantime, it will be appreciated that the shared memory 142 does not necessarily have to be a volatile memory. The shared memory 142 may be a non-volatile memory, such as a 3D Xpoint memory or Non-Volatile Dual Inline Memory Module (NVDIMM)-P, directly handled by a core (processor).

In the exemplary embodiment, the data set may be transmitted to the target software SWP1 and SWP2 via the shared memory 142.

A process of diagnosing software by the multicore system 100 for a vehicle according to the exemplary embodiment of the present invention will be described below.

All of the combinations generable in a system environment may be generated from memory map information and function/argument information of the target core (A) 110 (①). Herein, the memory map information may be built in the target core 110, and the function/argument information may be parsed in the target core 110.

The function/argument information and memory address information corresponding to the function/argument information are converted into a database in the verifying core (P) 130, so that the data set may be generated (②).

For convenience of the description, FIG. 2 illustrates the case where 100 data sets are generated, but it will be appreciated that the number of data sets of the present invention is not limited thereto.

Each data set may be formed of one function information (Func_PtrX), at least one argument information (ArgumentX), and a memory address (0xXXXXXXXX).

A data set (a function, an argument, and a memory address) corresponding to a test request for the target software (for example, SWP1) may be transmitted to the shared memory 142 (③).

In the present exemplary embodiment, it is assumed that the verification is performed by a first data set (or data set 1).

The target core (A) 110 may read a corresponding data set, and execute the target software SWP1 according to the read data set (④).

The execution result of the target software SWP1 is transmitted to the verifying core (P) 130 through the shared memory 142 (⑤), and the verifying core 130 may verify the target software SWP1 according to the received result.

The verification result of the target software SWP1 may be transmitted to an external device (for example, a PC 200) through the communication unit 144 through the UART/Ethernet (⑥).

The vehicle multicore system 100 according to the exemplary embodiment of the present invention enables the operations of the target software SWP1 and SWP2 to be verified by the internal verification software, thereby not requiring a separate test bench in a software diagnosis operation.

Figure 3:
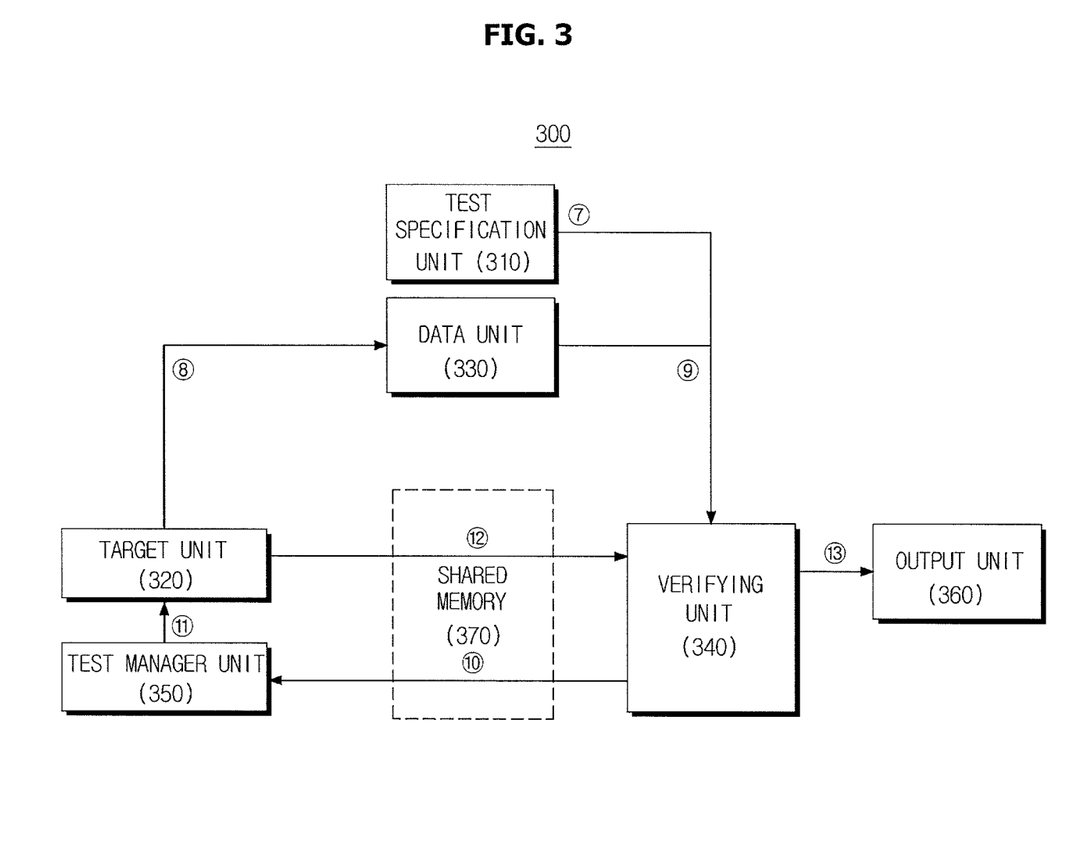
FIG. 3 is a diagram illustrating an example of a configuration of a system 300 for diagnosing software for a vehicle according to an exemplary embodiment of the present invention.

FIG. 3 is a diagram illustrating an example of a configuration of a system 300 for diagnosing software for a vehicle according to an exemplary embodiment of the present invention.

Referring to FIG. 3, the system 300 for diagnosing software for a vehicle may include a test specification unit 310, a target unit 320, a data unit 330, a verifying unit 340, a test manager unit 350, and an output unit 360.

The test specification unit 310 may output input data for a verification operation (⑦).

The target unit 320 may output memory map information and function/argument information of each of the target software SWP1 and SWP2 (⑧). Herein, the memory map information may include memory address information.

The target unit 320 may operate the target software according to a test sequence, and transmit the operation result to the verifying unit 340 through a shared memory 370 (the shared memory 142 in FIG. 2) (⑫).

The data unit 330 may receive information (the memory map information and the function/argument information) required in the test specification unit 130 from the target unit 302, and transmit the received information to the verifying unit 340 and convert the information into a database (⑨).

The data unit 330 may combine the memory map information and the function/argument information extracted from the target unit 310 in a data set (Func_Ptr, an argument, a memory address, and the like).

The data unit 330 may include the input data from the test specification unit 310 in the data set.

The verifying unit 340 may transmit the data set in the unit of a function included in the test sequence to the test manager unit 350 through the shared memory 370 (the shared memory 142 of FIG. 2).

The test manager unit 350 may operate the target unit 320 according to the transmitted test sequence (⑪). The verifying unit 340 may check the operation result from the target unit 320, verify the target software based on the operation result, and transmit the verification result to the output unit 360 (⑬).

In the exemplary embodiment, the verifying unit 340 may store an operation result (an expected operation result) expected for the data set, compare the operation result from the target unit 320 and the expected operation result, and verify the target software.

The output unit 360 may receive the verification result from the verifying unit 340 by using communication, such as a CAN, a UART, an SPI, an I2C, and Ethernet, and output the verification result. The output unit 360 may be an external PC 200 (see FIG. 2). of the multicore system 100.

In the exemplary embodiment, the test specification unit 310 and the output unit 360 may be implemented in the PC 200 illustrated in FIG. 2. In the exemplary embodiment, the target unit 320, the data unit 330, the verifying unit 340, and the test manager unit 350 may be implemented in the multicore system 100 illustrated in FIG. 2.

The system 300 for diagnosing software for a vehicle according to the exemplary embodiment of the present invention does not perform a test of a static test code existing in the target unit, but performs a test by transmitting, by the verifying unit, the information on the functions and the arguments desired to be executed to the target unit.

The target unit includes a manager program for performing the foregoing operation. Accordingly, the system 300 for diagnosing software for a vehicle of the present invention does not need to build or download a static test code for diagnosing software and may re-set a test in real time.

Figure 4:
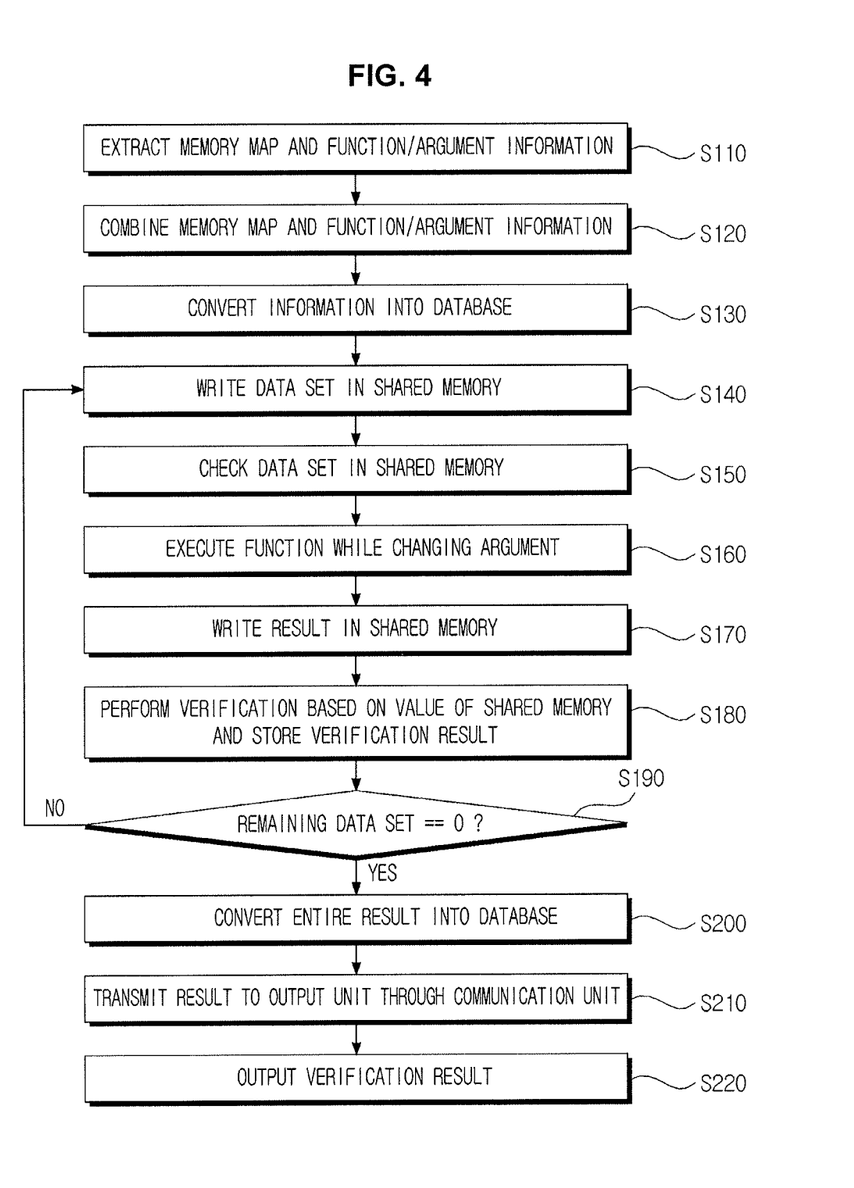
FIG. 4 is a flowchart illustrating an example of a method of diagnosing software by the system 300 for diagnosing software for a vehicle according to an exemplary embodiment of the present invention.

FIG. 4 is a flowchart illustrating an example of a method of diagnosing software by the system 300 for diagnosing software for a vehicle according to an exemplary embodiment of the present invention.

Referring to FIGS. 2 to 4, the method of diagnosing software by the system 300 for diagnosing software for a vehicle may be progressed as described below.

Memory map information and function/argument information of target software may be extracted from the target unit 320 (S110). The memory map information and the function/argument information may be combined in the data unit 330 (S120).

Output information of the data unit 330 is converted into a database in the verifying unit 340, so that a plurality of data sets related to a test operation may be generated, and the verifying unit 340 may write the generated data set in the shared memory 140 (S140).

When the data set is generated in operation S140, the verifying unit 340 may generate the data set by including input data input from the test specification unit 310.

The target unit 320 may periodically check the data set from the shared memory 142 (S150). The target unit 320 may execute the function while changing the argument included in the data set (S160). The target unit 320 may write the operation result in the shared memory 142 (S170).

The verifying unit 340 may verify target software based on a value of the shared memory 142, and store the verification result (S180).

For example, the verifying unit 340 may compare the operation result stored in the shared memory 142 with a preset expected operation result and verify the target software.

The verifying unit 340 may determine whether the number of remaining data sets (the number of data set that is not output to the shared memory) is 0. When the number of remaining data sets is not 0 ("NO" in operation S190), operation S140 may be performed. However, when the number of remaining data sets is 0 ("YES" in operation S190), the verifying unit 340 may convert the verification result in a database (S200).

That is, the verifying unit 340 determines whether the verification of the target software for the plurality of data sets is completed, and when the verification of the target software for the plurality of data sets is not completed ("NO" in operation S190), the verifying unit 340 may output a next data set to the shared memory, and when the verification of the target software for the plurality of data sets is completed ("YES" in operation S190), the verifying unit 340 may convert the verification result into a database.

The verifying unit 340 may transmit the verification result to the output unit 360 through the communication unit 144 (the UART or Ethernet). The output unit 360 may finally output the software verification result (S220).

Figure 5:
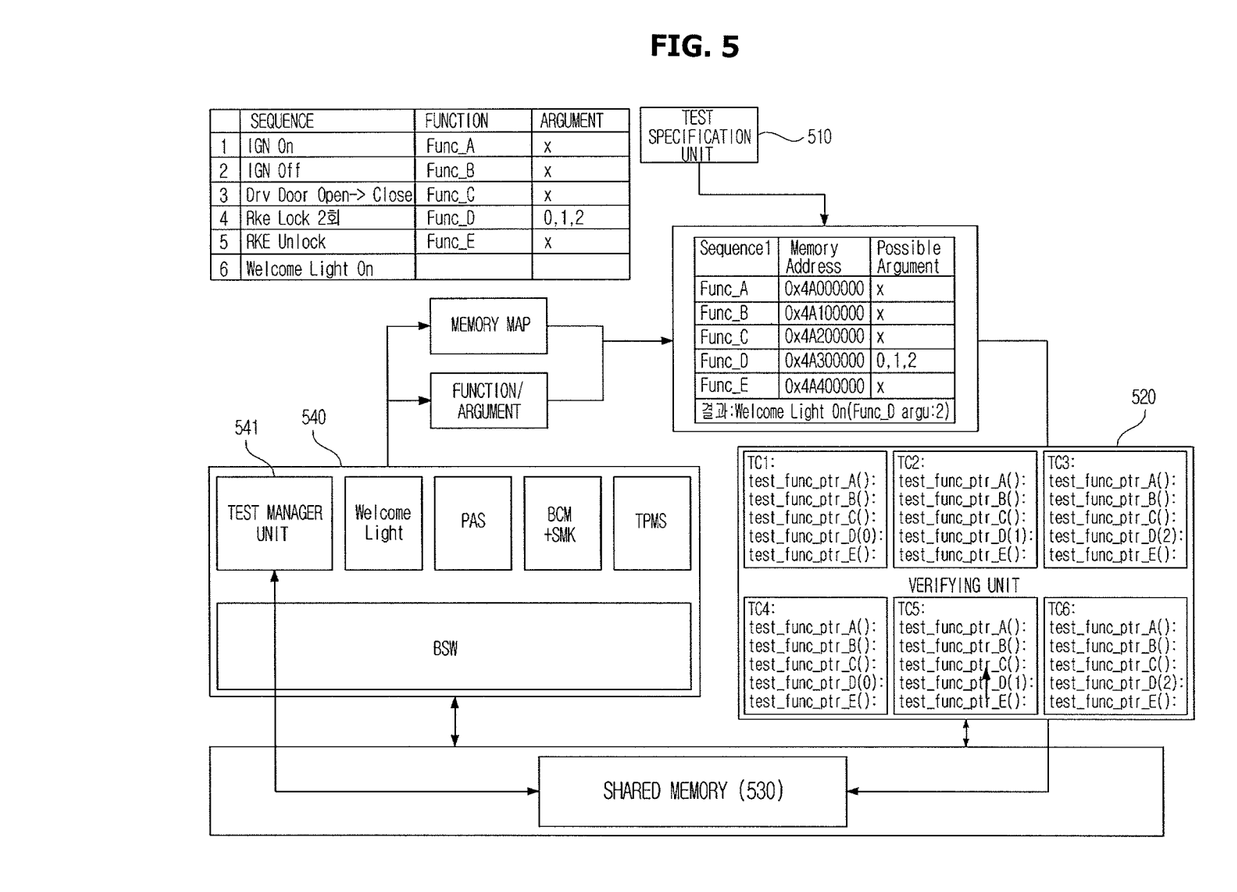
FIG. 5 is a diagram illustrating an example of a test operation related to welcome light software in the vehicle multicore system 100 according to the exemplary embodiment of the present invention.

FIG. 5 is a diagram illustrating an example of a test operation related to welcome light software in the vehicle multicore system 100 according to the exemplary embodiment of the present invention.

A test specification unit 510 may select and output all of the combinations of functions and arguments available in various vehicle environments (IGN on/off, door open/close, RKE lock/unlock, and the like) related to a welcome light.

Memory map information and function/argument information are extracted from welcome light software, and the extracted memory map information and function/argument information are converted into a database in the verifying unit 520 together with the information input from the test specification unit 510, so that a plurality of data sets (test commands) TC1 to TC6 may be generated.

Each of the data sets may be transmitted to the target processor 540 through the shared memory 530.

Software driven by the target processor may include Basic Software (BSW), a test manager unit, a welcome light, a Parking Assist System (PAS), a Body Control Module (BCM), a Smart Key (SMK), a Tire Pressure Monitoring System (TPMS), and the like.

A test manager 541 may read the data set from the shared memory 530, and operate the welcome light software according to the read data set.

Figure 6:
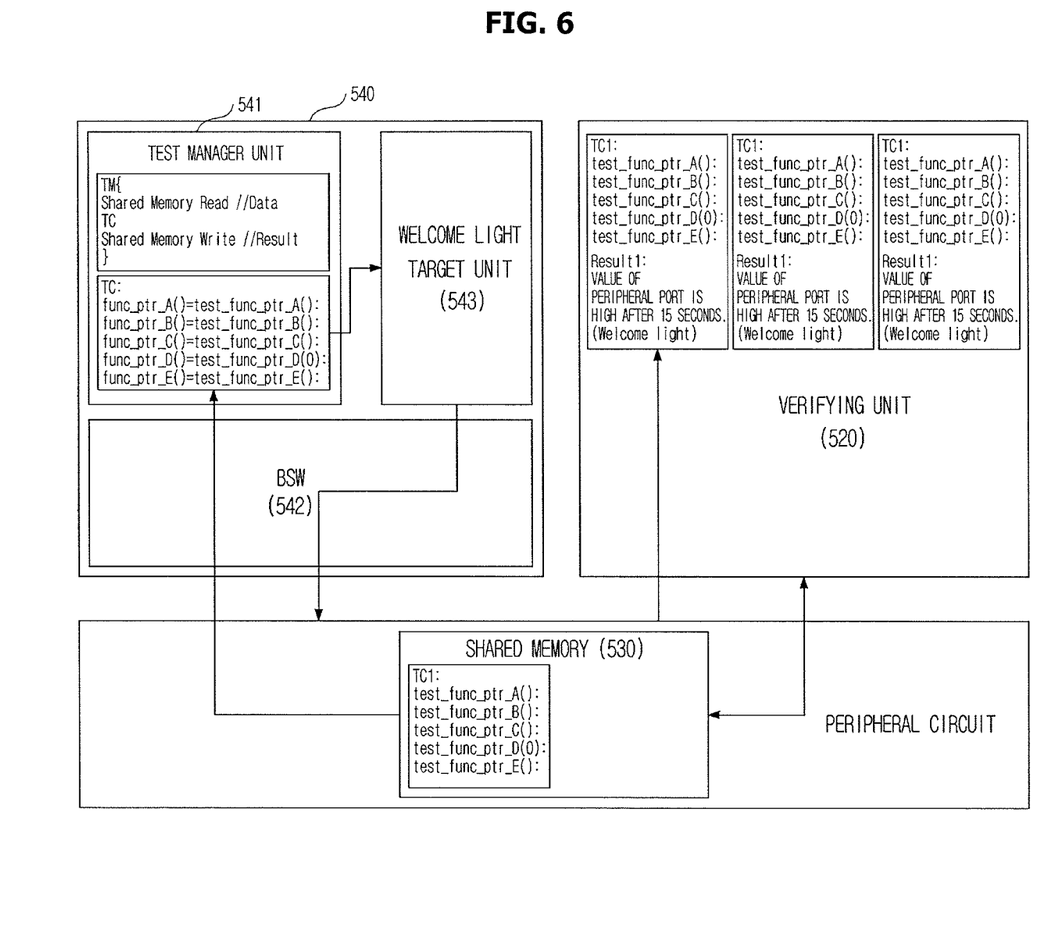
FIG. 6 is a diagram illustrating a process of verifying the welcome light software illustrated in FIG. 5 in detail.

FIG. 6 is a diagram illustrating a process of verifying the welcome light software illustrated in FIG. 5 in detail.

A BSW 542 of the target software may receive the data set from the shared memory 530 and transmit the received data set to the test manager unit 541, or output the operation result of the welcome light software 543 to the shared memory 530.

The test manager unit 541 may include a test command TC and a test message TM. Herein, the test message TM is a command directing read or write of the shared memory, and the test command TC is a command directing an operation of the target software.

Figure 7:
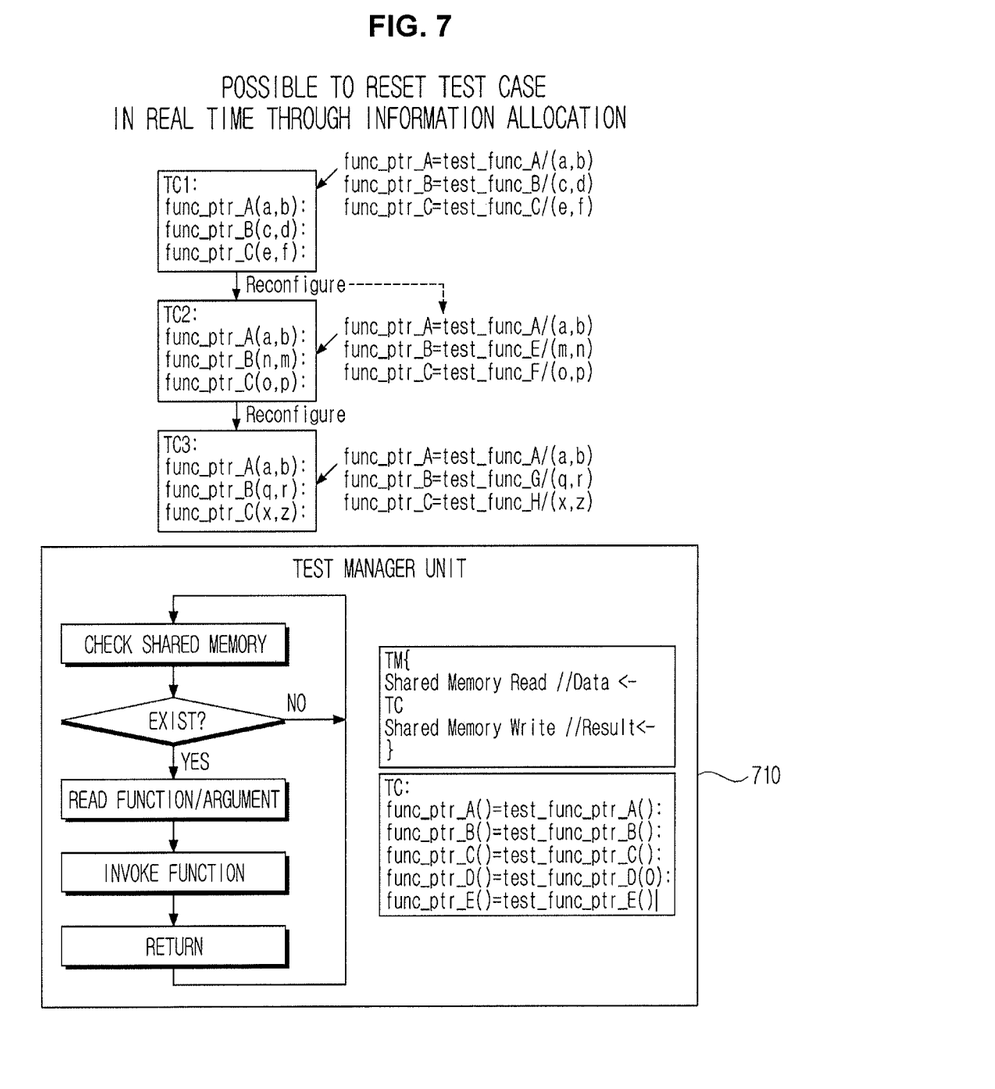
FIG. 7 is a diagram illustrating an example of a process of resetting a test case in real time in the system 300 for diagnosing software for a vehicle according to the exemplary embodiment of the present invention.

FIG. 7 is a diagram illustrating an example of a process of resetting a test case in real time in the system for diagnosing software for a vehicle according to the exemplary embodiment of the present invention.

A test manager unit 710 may check the shared memory and determine whether there is a related test case. When there is the related test case, the test manager unit 710 may read a function and an argument from the shared memory. When the related function is invoked, the test manager unit 710 may operate the target software, and the operation result of the software may be returned to the shared memory.

For example, it is assumed that there are 100 TCs (test commands). In a software diagnosis system in the related art, a test code is statically stored in a target unit (core). One TC may have several functions and arguments (parameters). When one function occupies 5 bytes, one TC is about 20 bytes on an assumption that one TC basically has four functions. When the number of TCs is 100, the size of the 100 TC is 2,000 bytes, and all of the TCs are stored in the shared memory.

In the meantime, in the system for diagnosing software of the present invention, the test manager may receive only one function through the shared memory (to which one function of about 5 bytes is allocated).

In the TC1, the verifying unit may transmit function func_ptr_A and argument (a, b) to the test manager unit through the shared memory. Then, the test manager unit may read the part and the target unit may execute the function/argument invoked by the test manager. Then, the verifying unit may transmit information on function func_ptr_B and argument (c, d) again.

The test manager unit may execute another TC. Finally, only a memory portion corresponding to one function and the plurality of arguments may be allocated (5 bytes) in the diagnosis operation.

The software diagnosis system in the related art performs a verification operation according to a statically fixed test case. However, the system for diagnosing software of the present invention may re-set a test case in real time through the allocation of the function/argument information.

Figure 8:
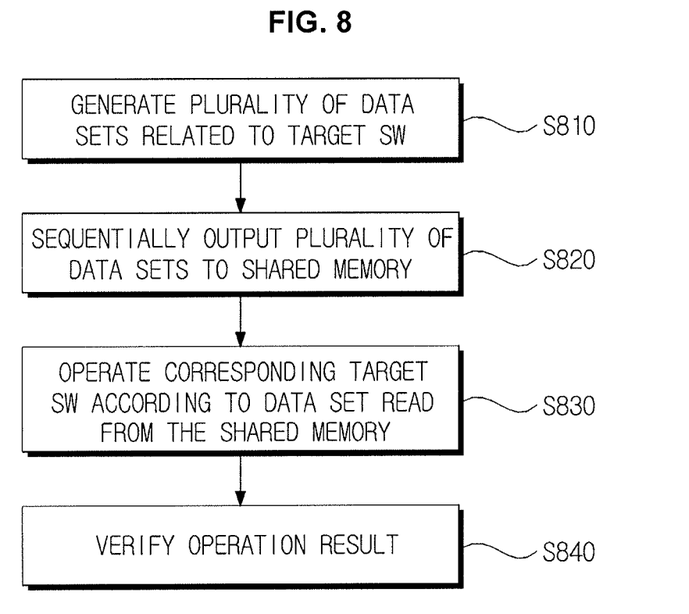
FIG. 8 is a flowchart illustrating an example of a method of operating the system 300 for diagnosing software for a vehicle according to an exemplary embodiment of the present invention.

FIG. 8 is a flowchart illustrating an example of a method of operating the system 300 for diagnosing software for a vehicle according to an exemplary embodiment of the present invention.

The method of operating the system 300 for diagnosing software will be described below with reference to FIGS. 2 to 8.

A plurality of data sets for a test operation may be generated by using memory map and function/argument information extracted from a target SW (S810). The plurality of data sets may be sequentially output to the shared memory (S820). The data set may be read from the shared memory, and the target software may be operated according to the read data set (S830). Then, the operation result is transmitted to the verifying unit through the shared memory, and the verifying unit may verify the target software based on the operation result (S840) and output the verification result.

The steps and/or the operations according to the present invention may be simultaneously incurred in other exemplary embodiments in a different order, in parallel, or for another epoch, which will be understood by those skilled in the art.

Depending on an exemplary embodiment, a part or all of the steps and/or the operations may be implemented or performed by using one or more processors driving a command stored in one or more non-temporary computer-readable media, a program, an interactive data structure, a client, and/or a server. An example of the one or more non-temporary computer-readable media may be software, firmware, hardware, and/or any combination thereof. Further, a function of a "module" discussed in the present specification may be implemented by software, firmware, hardware, and/or any combination thereof.

One or more non-temporary computer-readable media and/or means for implementing/performing one or more operations/steps/modules of the exemplary embodiments of the present invention may include Application-Specific Integrated Circuits (ASICs), standard integrated circuits, a microcontroller, a controller performing appropriate commands, an embedded controller, Field-Programmable gate Arrays (FPGAs), Complex Programmable Logic Devices (CPLDs), and the equivalent matters thereof, but are not limited thereto.

In the system for diagnosing software for a vehicle, and the operating method thereof according to the exemplary embodiment of the present invention, one core is configured as a platform for verification in a multicore environment, so that it is possible to verify other cores. In the exemplary embodiment, the shared memory may be used in a communication method (a command directing the progress of the test) between the cores for performing the verification. The shared memory is accessible from all of the cores, and is easily configured. Since the target SW and the verification SW exist within one system, all of the common peripheral circuits are accessible to the shared memory. The shared memory has the memory map information and the function/argument information of the target SW, so that coverage of the verification is considerably high. A verification case pre-defined in the target SW in the related art is not used, but the verifying unit may combine various test cases with the memory map information and the function/argument information in real time and progress a test based on the function.

The system for diagnosing software for a vehicle, and the operating method thereof according to the exemplary embodiment of the present invention may verify multiple cores in a multicore environment at one time. Further, the system for diagnosing software for a vehicle, and the operating method thereof according to the exemplary embodiment of the present invention may randomly and dynamically and omnidirectionally verify other cores in real time through the verifying core. An influence on target SWP performance may be decreased and validity of the verification may be increased. Reusability of the verification program may be increased. The cost of the verification according to the present invention is smaller than that of the related art.

In the meantime, the contents of the present invention are simply the particular exemplary embodiments for carrying out the present invention. The present invention may include a technical spirit that is abstract and conceptual idea utilizable as a technology in the future, as well as a particular and actually usable means itself.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method of operating a multicore system including a plurality of target cores and a verifying core for diagnosing software for a vehicle, the method comprising:

extracting, by a target unit, memory map information and function and argument information from each of target software loaded to memories of the plurality of target cores;

combining the extracted function and argument information and memory address information in the extracted memory map information corresponding to the extracted function and argument information;

generating a plurality of data sets by converting the combined information into a database according to a specification of each of the target software in the verifying core;

sequentially outputting the plurality of data sets to a shared memory;

operating, by a test manager, one of the target software according to one of the plurality of the data sets in the shared memory and letting, by the test manager, the target unit operate the target software according to the plurality of the data sets; and verifying an operation result of the target software which is operated by the test manager or the target unit in the verifying core.

2. The method of claim 1, wherein the operating of the target software includes checking, by the target software, the one of the plurality of the data sets of the shared memory and reading the one of the plurality of the data sets from the shared memory and operating the target software when the one of the plurality of the data sets exists in the shared memory.

3. The method of claim 1, wherein the operating of the target software includes operating the target software according to the function and argument information included in the one of the plurality of the data sets in such a manner that the function is executed while changing the argument.

4. The method of claim 1, further comprising:

determining whether a verification of the target software based on the plurality of data sets is completed, and when the verification of the target software is not completed, outputting a next data set to the shared memory.

5. The method of claim 4, further comprising:
when the verification of the target software is completed, converting a verification result for the target software into a database.

6. A system for diagnosing software for a vehicle, the system comprising:
a target unit configured to extract memory map information and function and argument information from each of target software loaded to memories of a plurality of target cores in a multicore system;
a data unit configured to combine the extracted function and argument information and memory address information in the extracted memory map information corresponding to the extracted function and argument information;
a verifying unit configured to generate a plurality of data sets by converting the combined information into a database in a verifying core of the multicore system according to a specification of each of the target software;
a shared memory configured to store at least one of the plurality of data sets; and
a test manager configured to operate the target unit according to one of the plurality of data sets stored in the shared memory and let the target unit operate the target software according to the one of the plurality of the data sets,
wherein the verifying unit reads an operation result stored in the shared memory, compares the read operation result and an expected operation result, and verifies the target software.

7. The system of claim 6, wherein the target unit operates the target software under a control of the test manager, and transmits an operation result to the shared memory.

8. The system of claim 6, wherein the verifying unit includes the verifying core including a verifying platform for verifying the plurality of target cores.

9. The system of claim 6, wherein the verifying unit determines whether there exists one of the plurality of the data sets which is not output to the shared memory, and when there exists the determined one of the plurality of the data sets, the verifying unit outputs a next data set to the shared memory, and when there does not exist the determined one of the plurality of the data sets, the verifying unit converts a verification result into the database.

10. The system of claim 6, wherein the target unit operates the target software according to the function and argument information included in the one of the plurality of the data sets in such a manner that the function is executed while changing an argument.

* * * * *